May 23, 1944.  J. JANDASEK  2,349,350
TURBO TRANSMISSION
Filed May 10, 1940  2 Sheets-Sheet 1
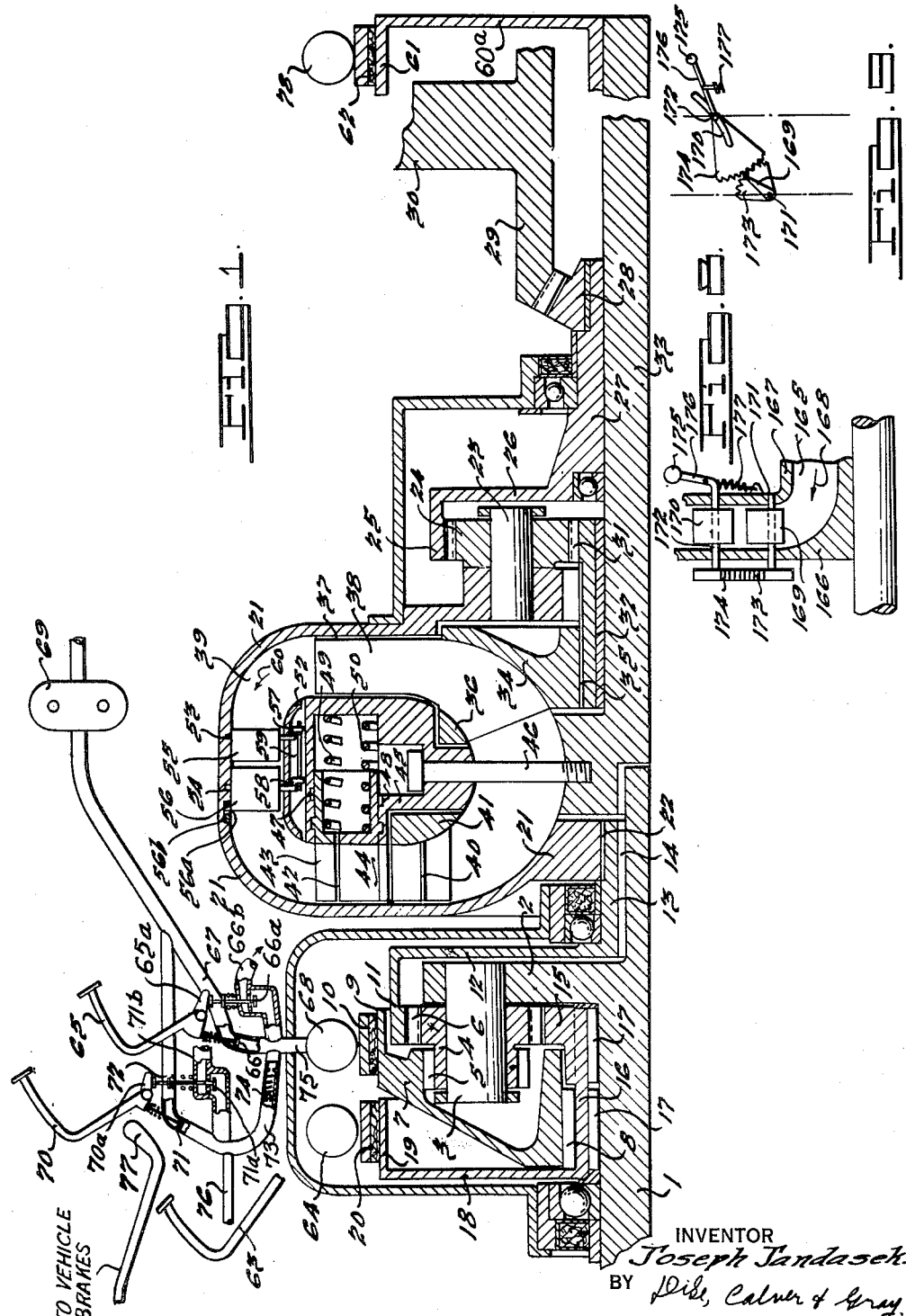
INVENTOR
Joseph Jandasek.
BY Dike, Calver & Gray
ATTORNEYS.

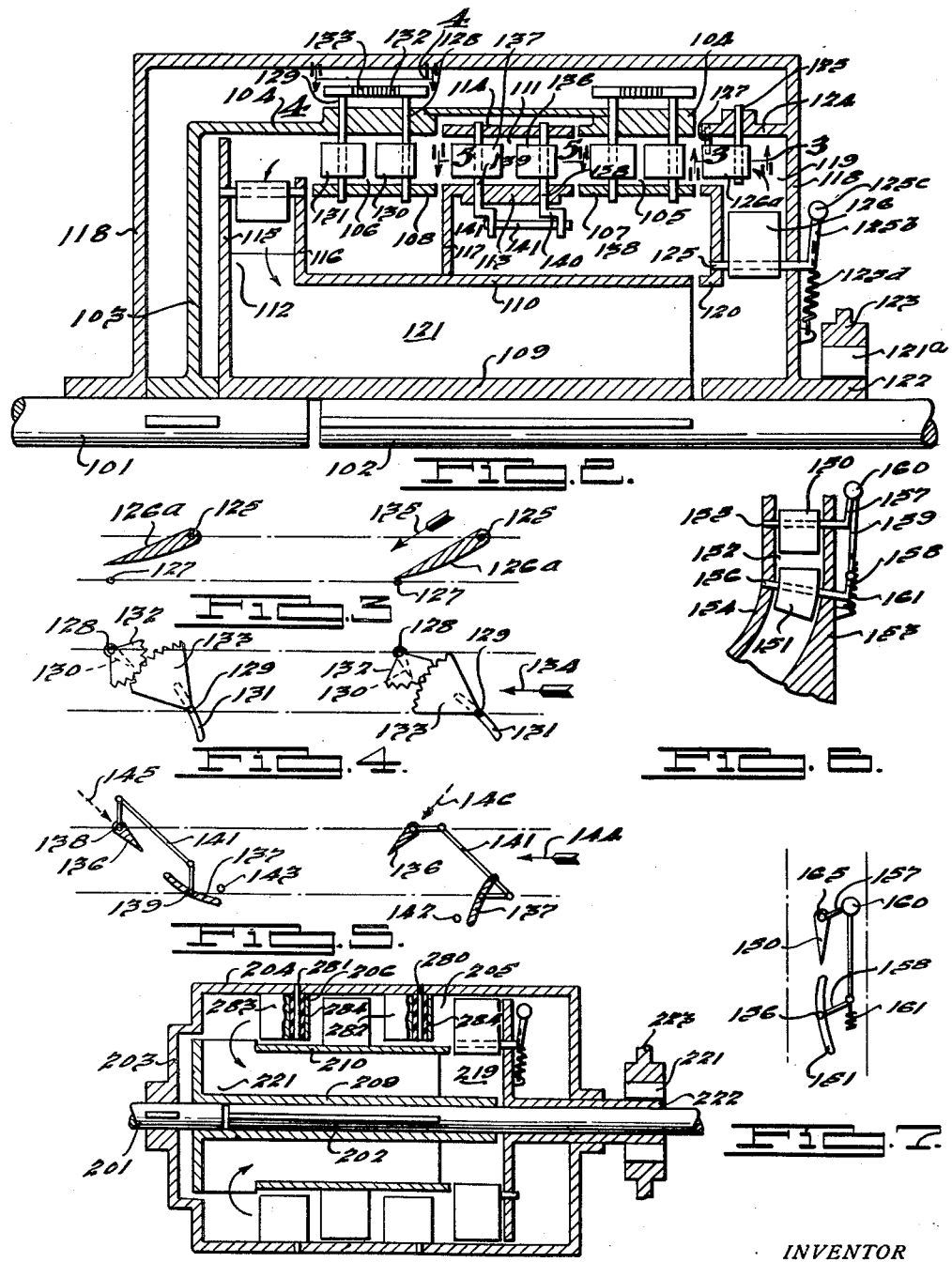

Patented May 23, 1944

2,349,350

UNITED STATES PATENT OFFICE 2,349,350

TURBOTRANSMISSION

Joseph Jandasek, Detroit, Mich., assignor to Bendix Aviation Corporation, South Bend, Ind., a corporation of Delaware Application May 10, 1940, Serial No. 334,315

17 Claims. (Cl. 192—4)

This invention relates to transmission devices, and more particularly to a turbotransmission adapted to transmit power more efficiently than has heretofore been possible.

An object of this invention is to provide speed increasing means to drive a turbounit and power regenerative means to increase the total torque output ratio of the device.

Another object of the invention resides in the provision of a turbounit having spaced interconnected vanes to vary the angular position of the vanes in proportion to variations of fluid reaction exerted on one of the interconnected vanes.

A further object is to provide interconnected main and guiding vanes wherein the guiding and rectifying vanes are subjected to fluid reaction and vary the angular position of the main vanes proportionately to the direction of the fluid flow.

Another object of the invention is to provide novel speed increasing means interposed between a driving shaft and a driven element of a turbounit wherein a portion of the energy imparted to the driven element is regenerated in the turbounit to drive a driven element thereof.

Yet a still further object resides in the provision of improved speed increasing means to drive a driven element of a turbounit accompanied by a progressively increasing regeneration of power within the turbounit as the power transmitted increases.

Another object is to provide improved speed increasing and reverse driving means between a prime mover and a turbounit whereby the power of the prime mover may be employed as a braking force.

A further object is to provide a turbotransmission which may be selectively utilized as an absorption dynamometer to exert a braking force.

Another object resides in the provision of means under the influence of the speed of a driven shaft to reverse the directoin of rotation of a driven element of a turbounit whereby the turbounit may be employed to exert a braking force and wherein manually operable means are provided to control the power developed by the prime mover proportionately to movement of the manually operable means.

Yet a still further object of the invention is to provide manually operable reverse means interposed between a prime mover and a turbounit to effect reverse drive.

A further object is to provide means under the control of the operator to reverse the direction of rotation of a rotatable element of a turbounit.

Another object is to provide manually operable means whereby a turbounit may be employed to exert a braking force, and the power developed by a prime mover will be varied proportionately to movement of the manually operable means to progressively increase the braking force exerted by the turbounit.

Other objects and advantages of this invention will be apparent from the following detailed description considered in connection with the accompanying drawings, submitted for purposes of illustration only, and not intended to define the scope of the invention, reference being had for that purpose to the subjoined claims.

In the drawings wherein similar reference characters refer to similar parts throughout the several views:

Fig. 1 is a vertical section of a transmission device embodying the present invention.

Fig. 2 is a vertical section of a modified form of the invention.

Fig. 3 is a diagrammatic view illustrating the position of the guide wheel vanes of Fig. 2 at light and heavy loads.

Fig. 4 is a view similar to Fig. 3 illustrating the position of impeller vanes of Fig. 2 at light and heavy loads.

Fig. 5 is a view similar to Fig. 4 illustrating the position of turbovanes of Fig. 2 in two operative positions.

Fig. 6 is a vertical section of a radial turbine embodying the present invention.

Fig. 7 is a diagrammatic view illustrating the position of the vanes of the device disclosed in Fig. 6.

Fig. 8 is a vertical section of a radial impeller embodying the invention.

Fig. 9 is a diagrammatic view illustrating the position of the vanes of the device disclosed in Fig. 8; and Fig. 10 is a vertical section of a modified form of the invention.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring now to Fig. 1, it will be observed that a driving shaft 1 operably connected to any suitable prime mover is provided with a radially extending flange 2. The flange 2 carries a plurality of spaced studs 3, each of which is provided with a planet pinion 4. The planet pinions 4 are compound in form having smaller and larger pinion gears 5 and 6 respectively. The smaller pinion gears 5 engage a ring gear 7 supported on suitable bearings 8. The ring gear 7 is provided with a flange or drum 9 adapted to be engaged by a brake band 10 to stop the ring gear 7 from rotation under certain operating conditions.

The pinion gears 6 mesh with a ring gear 11 carried by a radially extending flange 12 having an axially extending inner cylinder 13 supported on suitable bearings 14 associated with the driving shaft 1.

The pinion gears 6 also mesh with a sun gear 15 having an axially extending cylindrical portion 16 mounted on suitable bearings 17 associated with the driving shaft 1. The cylindrical portion 16 of the sun gear 15 is provided with a radially extending flange 18 terminating in a flange or drum 19 adapted to be engaged by a brake band 20 under certain operating conditions.

When the brake band 20 is actuated to lock the drum 19, flange 18, cylinder 16 and sun gears 15, power is transmitted from the driving shaft 1, flange 2, studs 3, pinion gears 6 to drive the ring gear 11 at a higher speed than the driving shaft 1.

When the brake band 10 is actuated to lock the drum 9 and the ring gear 7, power is transmitted from the driving shaft 1, flange 2, studs 3 to drive the ring gear 11 in reverse. In view of the variation in diameter in the pinion gears 5 and 6, when the ring gear 7 is locked against rotation with the sun gear 15 released, the pinion gears 5 rotate within the ring gear 7 and transmit power to the ring gear 11 in the reverse direction through the pinion gears 6 which are fixed to the pinion gears 5.

Power applied to the ring gear 11 is transmitted through the flange 12 and cylinder 13 to a rotatable housing 21 fixed to the cylinder 13 in any suitable manner such for example as by splines 22. The housing 21 is provided with a plurality of spaced studs 23 each of which is provided with a pinion gear 24. Each of the pinions 24 meshes with a ring gear 25 carried by a flange 26 mounted on a sleeve 27. The sleeve 27 is preferably provided with a beveled gear 28 which meshes with a final drive bevel gear 29 carried by a driven shaft 30.

The pinions 24 also mesh with a sun gear 31 mounted on suitable bearings 32 associated with a guide wheel shaft 33. The sun gear 31 is operably connected to an impeller web 34 in any suitable manner as by means of splines 35.

The impeller web 34 supports an impeller shroud 36 in spaced relation therewith in such a manner that an impeller channel 37 is interposed between the web 34 and shroud 36. Suitable impeller vanes 38 are carried by the web and shroud members 34 and 36 respectively to guide the fluid passing through the impeller channel 37.

A first stage turbine channel 39 is preferably positioned adjacent the discharge end of the impeller channel 37, and a second stage turbine 40 is interposed between a turbine shroud 41 and the rotatable member 21.

A guide wheel 42 is preferably interposed between the first stage turbine channel 39 and the second stage turbine 40. The guide wheel 42 is preferably formed with rectifying vanes 43 positioned to receive the fluid from the first stage turbine channel 39. Main guide vanes 44 are positioned to receive the fluid from the rectifying vanes 43 and transmit it to the second stage turbine 40. The rectifying and main vanes 43 and 44 respectively are carried by a guide wheel shroud member 45 operably connected in any suitable manner as by bolts 46 with the guide wheel shaft 33.

The rectifying vanes 43 and main vanes 44 of the guide wheel 42 may be withdrawn into the guide wheel shroud 45 in any suitable manner as under the influence of fluid reaction exerted thereon to move the vanes angularly on the helical slots 47 and 48 respectively interposed between the vanes and the shroud 45. Yielding means such for example as concentrically disposed springs 49 and 50 may be employed to yieldingly urge the vanes 43 and 44 respectively into the fluid channel. At heavy loads the rectifying and main vanes 43 and 44 are in the fluid channel as illustrated. At medium loads the rectifying vanes 43 are progressively moved by fluid reaction into the guide wheel shroud. At light loads both the rectifying and main vanes 43 and 44 are progressively moved out of the guide wheel channel into the shroud 45 whereupon the device is transformed from a torque converter into a turboclutch to transmit power at a substantially 1:1 gear ratio without any increase in torque.

The first stage turbine channel 39 preferably extends from the discharge of the impeller channel 37 to the rectifying vanes 43 of the guide wheel 42. A first stage turbine shroud 52 is spaced from the rotatable housing 21 and cooperates therewith to support a plurality of spaced shafts 53 and 54 pivotally mounted therein. Each of the shafts 53 is provided with a rectifying vane 55 and each of the shafts 54 is provided with a main vane 56. The shafts 53 and 54 may be formed with crank arms 57 and 58 respectively, and these crank arms may be interconnected by any suitable motion transmitting means such for example as a link 59.

In the operation of the device fluid issuing from the impeller channel 37 is preferably directed in the direction of the arrow 60 and impinges on the rectifying vane 55. The rectifying vanes 55 are acted on by the reaction of the fluid passing through the first stage impeller channel 37 and impart a portion of the energy of the fluid to the rotatable housing 21. The angular position of the rectifying vanes 55 varies in proportion to variations of the fluid reaction and the direction of flow of the fluid. Each of the main vanes 56 is provided with a projection 56a which projects into a suitable aperture formed in a ring 56b rotatably mounted in the housing 21. The position of the ring 56b relative to the housing 21 may be changed to vary the angular relation of the vanes. The crank arms 57 and 58 interconnected by the link 59 induce the shaft 54 to move angularly in response to angular movement of the shaft 53 whereupon the angular position of the main vanes 56 is controlled by the angular position of the rectifying vanes 55 as illustrated in Fig. 5 hereinafter more fully discussed.

The guide wheel which as pointed out above may be moved into the fluid circuit to operate the turbounit as a torque converter, or be withdrawn to operate the unit as a turboclutch, is fixed to the guide wheel shaft 33 which may be coaxially aligned with the driving shaft 1. The guide wheel shaft 33 is provided with a radially extending flange 60a terminating in a drum 61 which may be engaged by a brake band 62 to releasably lock the guide wheel against rotation or to permit the guide wheel shroud 45 to rotate freely with the rotatable housing 21 to transform the device into a turboclutch. The fluid power transmission is interposed between the driving and driven shafts and operates as a regenerative power transmitting means wherein the power from the driving shaft to the driven shaft is transmitted by means of the housing 21 to the pinions 24. The pinions 24 divide the power received between the ring gear 25 and the sun gear 31. The ring gear 25 is connected through the members 26, 27, 28 and 29 with a shaft 30. The sun gear 31 driven by the pinions 24 is connected to the impeller web 34 to transmit a portion of the power from the pinions 24 to the impeller blades 38 to energize the fluid. This power is transmitted from the impeller to the turbine, and from the turbine to the housing 21. A regeneration of a portion of the power is thus effected.

When it is desired to drive the turbounit in the forward direction wherein the sleeve 27 rotates in the same direction as the driving shaft 1, a manually operable lever 63 preferably having a releasable ratchet or hook may be actuated to operate a braking mechanism such for example as a hydraulic unit 64 to urge the brake band 20 into engagement with the flange 19 to lock the sun gear 15 against rotation. When this is done the drive proceeds from the driving shaft 1 through the flange 2, studs 3, pinion gears 6, ring gear 11, flange 12 to drive the rotatable element 21 in the same direction as the driving shaft 1 at a desired speed ratio.

When it is desired to rotate the sleeve 27 in the opposite direction to the driving shaft 1, a manually operable pedal 65 may be actuated to open a valve 66 interposed in a conduit 67 to admit fluid under pressure to a hydraulic unit 68 to urge the brake band 10 into engagement with the flange 9 to lock the ring gear 7 against rotation. The drive will then proceed from the driving shaft 1 through the flange 2, pinion gears 6, ring gear 11, and flange 12 to the rotatable housing 21. Due to the variation in the diameter of the ring gears 7 and 11, the rotatable housing 21 will be rotated in the reverse direction relative to the driving shaft 1 when the ring gear 7 is locked against rotation whereupon the sun gear 15 is released and the pinions 6 rotate within the ring gear 7.

Fluid pressure in the conduit 67 may be provided by means of a fluid pump 69 which may be driven by any suitable element such for example as the driven shaft 30, the engine or prime mover which transmits power to the turbounit, or some element driven by the rotatable housing 21, or otherwise. When it is desired to release the brake band 10, the fluid pressure in the unit 68 must be relieved. This is accomplished by an auxiliary valve 66a of similar construction to the valve 66. The valve 66a is actuated by a portion 65a of the pedal 65 which actuates the valve 66. The structure is such that one or the other of the valves 66 or 66a will be open at all times. The valve 66a is positioned in an open-ended conduit 66b and is moved to the open position by the portion 65a of the pedal 65 when the pedal is released. It will be noted that the pump 69 operates continuously and that the spring controlling the valve 66 is so calibrated as to maintain the valve 66 in the closed position except when actuated by the pedal 65.

When it is desired to use the turbounit as a brake a manually operable brake pedal 70 may be actuated to open a valve 71 in a conduit 72 communicating with the conduit 67 between the valve 66 and the pump 69 to admit fluid pressure to a conduit 73 communicating by way of a check valve 74 with a conduit 75 communicating with the hydraulic unit 68 beyond the valve 66 regardless of the position of the band 62 relative to the drum 61. When the brake pedal 70 is thus actuated fluid pressure from the pump 69 is admitted to the hydraulic unit 68 to urge the brake band 10 into locking engagement with the drum 9 to lock the ring gear 7 against rotation. The rotatable housing 21 is then rotated in the reverse direction and a braking force is developed to stop the vehicle or other device to which the unit is applied.

To avoid the possibility of stalling the engine when the turbounit is thus shifted into reverse to exert a braking force and to increase the braking force exerted by the turbounit, a conduit 76 communicating with the conduit 73 may be provided to actuate the throttle valve of the engine to increase the speed and power output of the engine proportionate to movement of the brake pedal 70 to exert a braking force. A valve 71a is provided to relieve the fluid pressure within the unit 68 and conduit 76 when the brake mechanism 10 is released. The valve 71a and its actuating mechanism are similar to the valve 71. When one of the valves 71 or 71a is open the other valve is closed. The valve 71a is positioned in an open-ended conduit 71b and is actuated by a portion 70a of the pedal 70.

In the event that a parking brake is desired or to hold the vehicle when the pump 69 is not operating at a sufficient speed to develop the pressure necessary to actuate the device, a suitable brake applying mechanism such for example as a hydraulic unit 77 positioned to be engaged by the brake pedal 70 after a substantially predetermined arc of movement, may be provided to actuate conventional vehicle brakes.

When it is desired to actuate the device as a torque converter, a suitable actuating mechanism such for example as a hydraulic unit 78 may be actuated to move the brake band 62 into locking engagement with the flange 61 to hold the guide wheel shaft 33 and the guide wheel against rotation. When it is desired to transform the device from a torque converter to a turboclutch, the hydraulic unit 78 may be released to permit the guide wheel shaft 33 and the guide wheel to rotate freely. The vanes 43 and 44 are then free to rotate freely with the guide wheel.

Referring now to Fig. 2 wherein an axial type turbounit is disclosed, it will be observed that a driving shaft 101 and a driven shaft 102 are preferably coaxially aligned. The driving shaft 101 is provided with a radially extending flange 103 which carries an axially extending cylinder 104. The cylinder 104 is provided with first and second stage impeller channels 105 and 106 respectively interposed between impeller shrouds 107 and 108 respectively supported by the cylinder 104.

The driven shaft 102 is provided with axially extending inner and outer cylinder members 109 and 110 respectively which support first and second stage turbine channels 111 and 112 respectively. The first stage turbine channel 111 is interposed between a turbine web 113 carried by a flange 117 supported on the cylinder member 110 and a turbine shroud 114. The second stage turbine channel 112 is interposed between a turbine web 115 carried by the cylinder member 109 and a turbine shroud 116 carried by the cylinder member 110.

A housing 118 surrounding the unit is rotatably mounted on the driving and driven shafts 101 and 102 respectively. A guide wheel channel 119 is interposed between the housing 118 and a guide wheel shroud 120.

In the operation of the device fluid circulates through the first stage impeller channel 105, first stage turbine channel 111, second stage impeller channel 106, second stage turbine channel 112, thence through a channel 121 interposed between the cylinder members 109 and 110 and is directed to the guide wheel channel 119 which communicates with the first stage impeller channel 105.

One-way driving means such for example as a clutch 121a interposed between a flange 122 carried by the housing 118 and a stationary member 123 may be provided to hold the housing 118 against rotation to operate the device as a torque converter, or to release the housing for rotation whereupon the device operates as a turboclutch to transmit power.

The guide wheel channel 119 may be bounded by the guide wheel shroud 120, housing 118 and a flange 124 carried by the housing 118. Shafts 125 and 125a may be provided to position entrance and discharge gates 126 and 126a respectively in the guide wheel channel 119. The entrance gates 126 are preferably fixed to the shafts 125 in such a manner that they move angularly upon rotation of the shafts 125. The shafts 125 may be formed with a crank arm 125b having a weight 125c fixed thereto to influence the angular position of the gates 126 under certain conditions of operation, and a suitable spring 125d may also be provided to influence the angular position of the entrance gates 126 under certain conditions of operation. The discharge gates 126a are preferably pivotally mounted on the shafts 125a in such a manner that they are free to move angularly under the influence of fluid reaction. The angular movement of the discharge gates 126a is limited by stop members 127 which may be carried by the flange 124.

The left hand portion of Fig. 3 illustrates diagrammatically the position of the gates 126a when the device is operating at light load at high speed, and the right hand portion of Fig. 3 illustrates diagrammatically the position of the gates 126a at heavy loads when the device is operating at relatively slow speed. The arrow 135 indicates the direction of fluid flow through the guide wheel.

A pair of spaced shafts 128 and 129 projects from the impeller shrouds 107 and 108 of the first and second stage impellers and preferably extends through the cylinder 104. The shafts 128 and 129 are provided with rectifying and main blades 130 and 131 respectively fixed to the shafts. The shafts 128 and 129 are interconnected by suitable motion transmitting means such for example as gear segments 132 and 133 respectively. The left hand portion of Fig. 4 illustrates the position of the impeller blades at light load wherein the device is operating at relatively high speed, and the right hand portion of Fig. 4 illustrates the position occupied by the blades when the device is operating at heavy loads at relatively low speeds. It will be observed that the arrow 134 of Fig. 4 indicates the direction of rotation of the impeller.

The first stage turbine channel 111 is provided with rectifying vanes 136 and main vanes 137 fixed to suitable shafts 138 and 139 respectively carried by the turbine web 113 and turbine shroud 114. Each of the shafts 138 and 139 is provided with a crank 140 and 141 respectively operably interconnected by means of a link 141 in such a manner that the angular position of the rectifying vane 136 will affect the angular position of the main vanes 137. Main vanes 137 are movable angularly and are restrained from moving beyond a substantially predetermined angular position by means of stops 142 and 143. The arrow 144 of Fig. 5 illustrates the direction of rotation of the turbine. The left hand portion of Fig. 5 shows the approximate angular position which the turbine vanes will occupy when the device is operating at light load at relatively high speed, and the right hand portion of Fig. 5 illustrates the approximate angular position of the vanes when the device is operating at heavy loads at relatively slow speeds. The arrow 145 illustrates diagrammatically the general direction of the fluid flow through the device past the vanes when the device is operating at light loads at relatively high speeds, and the arrow 146 indicates the general direction of fluid flow when the device is operating at heavy loads at relatively slow speeds.

Figs. 6 and 7 illustrate interconnected rectifying and main vanes 150 and 151 positioned in a radially extending turbine channel 152. The turbine channel 152 is interposed between a turbine web 153 and a turbine shroud 154. The rectifying and main vanes 150 and 151 are fixed to shafts 155 and 156 respectively. The shafts 155 and 156 are provided with cranks 157 and 158 operably connected by means of motion transmitting means such for example as a link 159. One of the cranks 157 and 158 may be provided with a counterweight 160, and a spring 161 may be provided to resist the force exerted by the counterweight 160 in controlling the angular position of the rectifying and main vanes 150 and 151 which position is also influenced by the reaction of fluid passing through the turbine channel 152.

Figs. 8 and 9 disclose a radial impeller channel 165 interposed between an impeller web 166 and an impeller shroud 167. The fluid flow through the impeller channel 165 is in the direction of the arrow 168, and the fluid passes over rectifying and main vanes 169 and 170 fixed to spaced shafts 171 and 172 respectively carried by the impeller web and shroud members 166 and 167. Suitable motion transmitting means such for example as segmental gears 173 and 174 carried by the shafts 171 and 172 are provided to vary the angular position of the main vanes in response to variation of angular movement of rectifying vanes 169 under the influence of fluid reaction in the impeller channel 165. A suitable counterweight 175 may be carried by an arm 176 fixed to one of the shafts 171 and 172 if desired, and suitable resilient means 177 operably connected to the arm 176 may be provided to exert a force to influence the angular position of the rectifying and main vanes 169 and 170 if desired.

The embodiment of the invention illustrated in Fig. 10 is similar in many respects to that illustrated in Fig. 2, and corresponding parts have therefore been given corresponding reference numerals with the addition of 100.

It will be observed that the impeller web 204 operably connected to the driving shaft 201 through the flange 203 is provided with shafts 280 and 281 which carry angularly movable vanes 282 and 283 respectively. Suitable resilient means such for example as rubber 284 may be interposed between the shafts 280 and 281 and the vanes 282 and 283 respectively to yieldingly urge them toward a substantially predetermined angular position and to permit them to move angularly from said position under the influence of fluid reaction exerted thereon.

It is to be understood that the various features disclosed in the different embodiments of this invention may be combined with each other without departing from the spirit of my invention.

This is a continuation-in-part of my copending application Serial No. 547,256, now Patent No. 2,271,919, issued February 3, 1942.

I claim:

1. In a fluid power transmission, a casing, a quantity of fluid in the casing, a driving vane wheel energizing the fluid, driven vane wheels coaxial with the driving vane wheel absorbing energy from the fluid, main and auxiliary blades carried by one of the driven vane wheels, and connecting means between the main and auxiliary blades, the auxiliary blades regulating the position of the main blades.

2. In a fluid power transmission, a casing, fluid and rotary juxtaposed blade wheels in the casing, a fluid channel in the blade wheels, at least one of the wheels having a plurality of sets of vanes including main and auxiliary vanes, and connecting means between the main and auxiliary vanes, the auxiliary vanes controlling the position of the main vanes.

3. In a transmission device for a vehicle, a driving shaft, a turbounit, speed varying and reverse driving means interposed between the driving shaft and turbounit, a driven member, a source of fluid pressure driven by said driven member, and means under the influence of said source of pressure to actuate the reverse driving means whereby the turbounit may be employed as a vehicle brake.

4. In a transmission for a motor vehicle having a throttle controlled prime mover, a turbounit, speed varying and reverse means between the driving shaft and turbounit, a source of fluid pressure, means actuated by said source of fluid pressure to control the speed varying and reverse means, manually operable means to control said fluid pressure means, and means to progressively increase the power developed by the prime mover when the manually operable means is actuated.

5. In a transmission, a driving shaft, a turbounit, speed varying means including a reverse mechanism between the driving shaft and turbounit, a source of fluid pressure independent of the turbounit, a brake pedal, and means controlled by the brake pedal and actuated by said fluid pressure to reverse the direction of rotation of the turbounit whereby the turbounit may be employed as a brake.

6. In a transmission, a driving shaft, a driven shaft, a turbounit interposed between the driving and driven shafts, speed varying and reverse means associated with the turbounit, a source of fluid pressure independent of the turbounit, manually operable means controlling the source of fluid pressure to actuate the reverse means whereby the turbounit may exert a braking force.

7. In a power transmitting device, a driving shaft, a driven shaft, a turboclutch interposed between the driving and driven shafts, reverse drive means associated with the turboclutch, a source of fluid pressure responsive to the speed of the driven shaft, and manually operable means controlling the source of fluid pressure to actuate the reverse means whereby the turboclutch may be employed as a braking device.

8. In a power transmitting device for a throttle controlled vehicle, a driving shaft, a driven shaft, a turboclutch interposed between the driving and driven shafts, reverse drive means associated with the turboclutch, a source of fluid pressure, manually operable means controlling the source of fluid pressure to actuate the reverse means whereby the turboclutch may be employed as a braking device, and means controlled by the manually operable means to actuate the throttle to increase the braking power developed.

9. In a turbounit, driving and driven members, impeller and turbine wheels associated with the driving and driven members and forming a channel for the circulation of power transmitting fluid, a plurality of sets of angularly movable vanes comprising rectifying and main vanes positioned in the circuit, and connecting means between the rectifying and main vanes whereby the angular position of the main vanes is influenced by the angular position of the rectifying vanes.

10. In a transmission device for a vehicle having brakes, a driving shaft, a driven shaft, a turbounit interposed between the driving and driven shafts, forward and reverse driving means between the driving shaft and turbounit, pressure inducing means under the influence of the driven shaft, means operated by the pressure inducing means to actuate the forward and reverse driving means, selectively operable manual means controlling the pressure inducing means to actuate the forward and reverse driving means, manually operable means controlling the pressure inducing means to reverse the direction of the turbounit to apply a braking force, and means operable after a substantially predetermined movement of said manually operable means to actuate the vehicle brakes.

11. An axial type turbounit comprising driving and driven shafts, a plurality of spaced impeller elements operably connected to the driving shaft, a plurality of turbine elements operably connected to the driven shaft, each of the turbine elements being spaced to lie adjacent each of the impeller elements and cooperating therewith to form a power transmitting fluid circuit, rectifying and main vanes positioned in the circuit, and motion transmitting connecting means interposed between the rectifying and main vanes whereby the angular position of the main vanes is influenced by the angular position of the rectifying vanes.

12. In a transmission, a driving shaft, a turbounit including a rotatable housing, speed ratio varying means driven by the driving shaft to rotate the rotatable housing of the tubounit, a driven shaft, and motion transmitting means driven by said rotatable housing to direct a portion of the power to the driven shaft and to redirect the remainder of the power through the housing to the speed ratio varying means.

13. In a transmission, a driving shaft, a turbounit including a rotatable housing, forward and reverse drive means driven by the driving shaft to rotate the rotatable housing, a driven shaft, power-transmitting means driven by the rotatable housing to direct a portion of the power to the driven shaft and to redirect the remainder of the power through the housing to the forward and reverse drive means, and manually operable means to selectively actuate the forward and reverse drive means whereby the turbounit may be employed as a brake.

14. In a transmission device, a driving shaft, a driven shaft, a turbounit, speed varying means interposed between the driving shaft and turbo unit, power-transmitting means driven by the speed varying means to direct a portion of the power to the driven shaft and to redirect the remainder of the power to the speed varying means, a source of fluid pressure independent of the turbounit, and means under the influence of said source of pressure to actuate the speed varying means.

15. In a transmission, a driving shaft, a driven shaft, a turbounit comprising a rotatable housing interposed between the driving and driven shafts, speed varying means between the driving shaft and turbounit, power-transmitting means driven by the speed-varying means to direct a portion of the power through to the turbounit to the driven shaft and to redirect the remainder of the power to the speed varying means, a reaction member in the turbounit, and means to selectively release the reaction member to rotate with the housing whereby the unit may operate as a turboclutch or to lock the reaction member against rotation whereby the device may operate as a torque converter.

16. In a transmission for a vehicle, a driving shaft, a driven shaft, a turbounit comprising a rotatable housing interposed between the driving and driven shafts, speed varying and reverse driving means between the driving shaft and turbounit, power transmitting means driven by the speed varying and reverse driving means to direct a portion of the power to the driven shaft and to redirect the remainder of the power through the turbounit to the speed varying and reverse driving means, a reaction member in the turbounit, means to selectively release the reaction member to rotate with the housing whereby the unit may operate as a turboclutch or to lock the reaction member against rotation whereby the device may operate as a torque converter, and manually operable means to operate the reverse driving means whereby the turbounit may be employed as a vehicle brake.

17. In a transmission device, driving and driven shafts, a turbounit comprising impeller and turbine wheels cooperating to form a power-transmitting fluid circuit, speed varying means between the driving shaft and turbounit, a plurality of sets of angularly movable vanes including rectifying and main vanes positioned in the circuit, connecting means between the rectifying and main vanes whereby the angular position of the main vanes is influenced by the angular position of the rectifying vanes, and power-transmitting means driven by the speed varying means to drive the driven shaft whereby a portion of the power is transmitted to the driven shaft and the remainder of the power is redirected to the speed varying means.

JOSEPH JANDASEK.